United States Patent
Hayasaka

[15] 3,668,448
[45] June 6, 1972

[54] HOMOPOLE TYPE AC GENERATOR

[72] Inventor: Enakichi Hayasaka, No. 322, Nakazato-cho, Kita-ku, Tokyo, Japan

[22] Filed: May 13, 1971

[21] Appl. No.: 142,923

Related U.S. Application Data

[63] Continuation-in-part of Ser. No. 740,390, May 27, 1968.

[30] Foreign Application Priority Data

May 15, 1970 Japan.....................................45/40890
May 29, 1967 Japan.....................................42/33690

[52] U.S. Cl..........................................................310/166
[51] Int. Cl. ....................................................H02k 17/00
[58] Field of Search....................310/178, 40, 152, 155, 156, 310/159, 161, 166, 168, 171, 174, 178, 261, 264, 265, 266

[56] References Cited
UNITED STATES PATENTS 2,206,920  7/1940  Riggs.....................................310/161
2,628,332  2/1953  Richardson........................310/166 X
2,692,957  10/1954  Clark....................................310/156
2,889,475  6/1959  Emerson.............................310/266

*Primary Examiner*—James D. Trammell
*Assistant Examiner*—R. Skudy
*Attorney*—Sparrow and Sparrow

[57] ABSTRACT

A homopole type AC generator consisting of a rotary magnetic pole body rotatable by a rotational force from outside, a yoke core through which magnetic fluxes flow from the N pole of the rotary magnetic pole body to the S pole and forms a part of magnetic path, and generating coils provided at positions interlinking with the magnetic path. The generating coils have induced AC voltage so as to effect AC generation as the magnetic fluxes make magnetic engagement and disengagement with or from the generating coils during the rotation of the rotary magnetic pole body.

6 Claims, 33 Drawing Figures

PATENTED JUN 6 1972 3,668,448
SHEET 1 OF 7
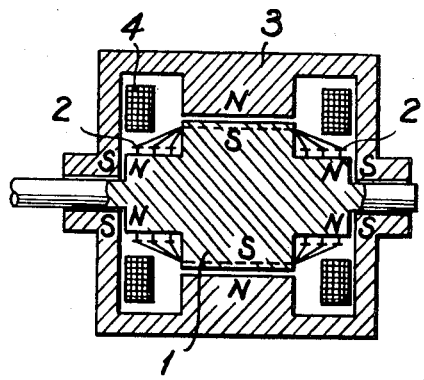
FIG. 1
PRIOR ART
FIG. 3
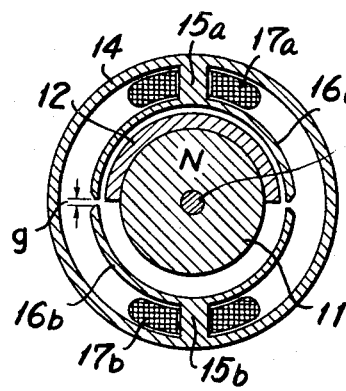
FIG. 2
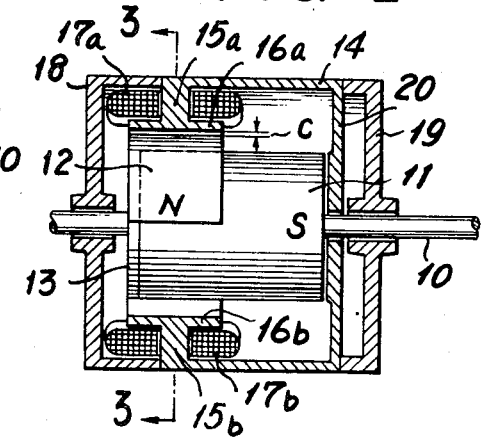
FIG. 5
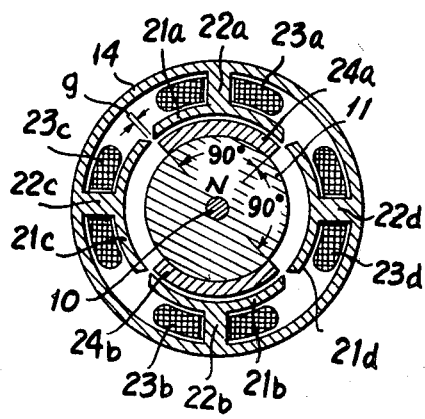
FIG. 4
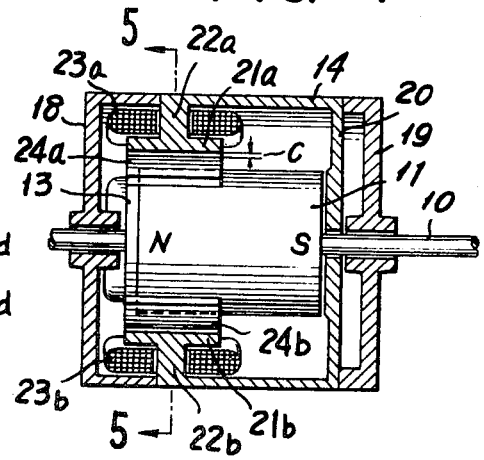
INVENTOR.
ENAKICHI HAYASAKA
BY
Sparrow and Sparrow
ATTORNEYS INVENTOR.
Enakichi Hayasaka
BY
Sparrow and Sparrow
ATTORNEYS

HOMOPOLE TYPE AC GENERATOR

BACKGROUND OF THE INVENTION

This application is a continuation-in-part application of the copending patent U.S. Pat. application Ser. No. 740390, now appealed, "HOMOPOLE AC GENERATOR" filed on May 27, 1968 by the same applicant.

The present invention relates to a homopole type AC generator, and particularly to an AC generator which is of homopole type arrangement and is adapted to generate alternating current depending upon magnetic engagement and disengagement of interlinkaging operations of magnetic fluxes.

The principles of conventional rotary type generators to convert rotational power into electrical power are classified as follows: There is a method wherein either magnetic fluxes fixed to a pole surface are rotated with the magnetic fluxes forming magnetic circuits, or an armature is rotated to produce dynamic displacements between the conductor of the armature and magnetic fluxes for causing the conductor to successively cross the magnetic fluxes, whereby a voltage is generated according to Fleming's left-hand rule effect. There is another method wherein the magnetizing force is mechanically increased and decreased so as to produce an interlinkage (or engagement) and dis-interlinkage (or dis-engagement) operation between coils in an armature and magnetic flux link, and the fluctuating magnetic fluxes due to said increase and decrease generate a voltage according to Lenz effect.

The first method is utilized for most existing rotary generators while the second one is applied only to a few special uses, for example, in an outburst type magnet generator for ignition or in an Edison high-frequency generator. For the sake of convenient description, the first method is hereunder termed "cross movement type generating method" and the second one is called "magnetism engagement and disengagement type generating method."

A different view point classifies the conventional generating types as follows: There is a multipolar type of generator which is of such arrangement that the magnetic circuits of a magnetic pole are disposed radially with respect to the axis of a shaft which drives an armature. The magnetic circuits are disposed on the plane vertical to the driving axis so as not to cross the axis. And different poles N and S are alternatively disposed on the vertical plane. There exists also a homopole type of generator which is formed on the principle that the movement of a wire in the direction crossing the magnetic flux produces a uni-directional electromotive force thus to generate a direct current and wherein the magnetic circuits are connected in more than two planes and are in parallel with respect to the axis for driving the armature.

Combinations of the above-classified conventional methods and types are further classified into four types, namely, (a) multipolar — cross movement type (AC and DC), (b) multipolar— magnetism engagement type (AC), (c) multipolar— magnetism disengagement type (AC) and (d) homopole — cross movement type (DC).

A conventional cross-movement type generator has a defect in that the magnetic flux at the pole surface is biased toward one side of the pole surface by a reaction power from the current flowing through the coils and further in that the degree of the bias varies with the exciting force of the coil, with the result that no output of stabilized wave form is obtainable. Furthermore, a multipolar type generator is required to be provided with a substantial width of non-magnetic flux or neutral area between different kinds of poles as well as with similar spaces between armature core teeth. This reduces to one-half the effective operation angles rotated as compared with the corresponding driving angles which results in causing of hunting so that the waves are discontinuous. A consideration of the space factors of a single-phase generators of small diameter will make it apparent that this harmful effect remarkably accompanies such a generator.

Still further, conventional magnetism engagement type and magnetism disengagement type generators have the shortcoming that they inefficiently utilize only one of the engaging and disengaging operations between magnetic fluxes and that they require a large number of magnetic poles having large magnetic force.

As it will be described later in detail, the generator of the present invention is of the homopole— magnetism engagement and disengagement type (AC) which does not belong to any of the existing types of generators.

The principle of the generating operation by the generator according to the present invention is summarized as follows:

The axis of the shaft for driving the generator is disposed as to coincide with the magnetic axis of the rotary magnetic pole body driven by the driving shaft. Armature cores are positioned within the range of the homopole of N and S poles of the magnetic pole. The magnetic flux passing through the armature cores are subjected to variation by the rotation of the magnetic pole and generate a current of a half cycle through a course wherein the magnetic fluxes are brought into "engagement" or interlinkage with coils of the armature cores. A current of a next half cycle is also generated through a subsequent course wherein the magnetic fluxes are "disengaged" from the armature core coils, or in other words, the magnetic fluxes are released from their interlinkages with the coils. Totally, in the above two half-cycles one cycle of alternating current is generated. A single rotary magnetic pole (rotor) and a single fixed armature part which conduct the mentioned operation may constitute a single element which is for a single phase and which may be divided into appropriate number of elements in the homopole for polyphase. Further, an appropriate selection of the magnetic pole of the rotor facing the armature will make it possible to obtain a voltage of a selected one of various wave forms such as rectangular form, triangular form etc.

The homopole type generator of the present invention is based on the magnetism engagement and disengagement principle. This prevents any irregularity from being produced by the reaction power from the current. Further, the generator according to the invention utilizes magnetic variations generated by both engaging and disengaging operation of a magnetic interlinkage for generating a power. This affords the generator a highly increased efficiency of generation. Furthermore, the movement of the magnetic engagement and disengagement operation continues in a remarkably stabilized condition since no constant is given when the reaction power controls the velocity of the magnetism engagement and disengagement.

It is a primary object of the present invention to provide an entirely novel and useful homopole type AC generator which depends only on a homopole to generate an alternating current.

Another object of the invention is to provide an AC generator which utilizes both engaging and disengaging operations in a magnetic linkage.

A further object of the invention is to provide an AC generator which is able to generate an alternating current of a desired wave from such as rectangular or triangular one.

A further object of the invention is to provide an AC generator which has a revolution vs. generated voltage characteristic of an enlarged linear range with the use of the permanent magnet of large latent magnetizing force and small permiability.

A still further object of the invention is to provide an AC generator whose speed vs. generated voltage characteristic has a linear portion up to the limit of the speed and whose generated output remains substantially constant regardless of a further increase of the speed beyond said limit.

Other object and features of the present invention will made apparent from the following description in conjunction with the accompanying drawings.

BRIEF DESCRIPTION OF THE DRAWING

FIG. 1 is a vertically sectional side view of one example of a conventional homopolar machine which generates a DC current;

FIG. 2 is a side view of an embodiment of the single phase, single element and single pole AC generator according to the present invention with a part thereof being shown in longitudinal section;

FIG. 3 is a cross-sectional front view taken along line 3—3 in FIG. 2;

FIG. 4 is a side view of an embodiment of the single phase, single element and two pole AC generator according to the present invention with a part thereof being shown in longitudinal section;

FIG. 5 is a cross-sectional front view taken along line 5—5 in FIG. 4;

DESCRIPTION OF THE PREFERRED EMBODIMENTS

Figure 7:
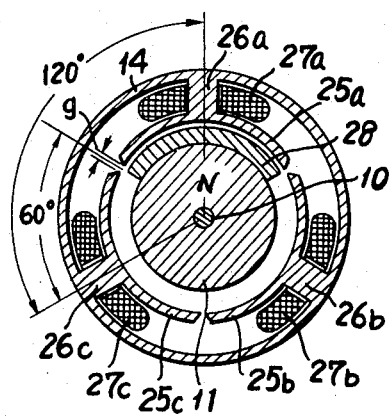
FIG. 7 is a cross-sectional front view taken along line 7—7 in FIG. 6.

In FIG. 1, a conventional homopolar machine is shown. Rotor 1 has many slots on its periphery. Ends of conductor wires which are inserted into slots of the rotor 1 are respectively connected to a slip ring 2. A stator 3 is excited by an exciting coil 4. In the machine of the construction described, the rotor 1 rotates and the conductor wires in the slots of the rotor 1 successively move across the magnetic flux in the same direction. Accordingly, there is produced DC generation. The homopolar machine can perform only DC generation. It cannot produce AC generation.

As compared with the conventional machine, the present invention provides an AC generator which has an arrangement of a homopole type which is adapted for AC generation. Embodiments of the present invention will be described with reference to FIG. 2 and the following figures.

FIGS. 2 and 3 show an embodiment of the single phase, single element and single pole AC generator having a rotary drive shaft 10 made of non-magnetic material to which is fixed a cylindrical rotary magnetic pole body 11 of a permanent magnet having at one end the N pole and at the other end the S pole. The arrangement is such that the magnetic axis of the magnetic pole body 11 coincides with the axis of the drive shaft 10. An electromagnet may be substituted for the permanent magnet 11. A semi-cylindrical pole piece 12 is secured to a pole cap 13 which in turn is mounted on the rotary magnet pole body 11 at one end, for example, the N pole end thereof. The pole piece 12 is of such width that it extends within the N pole range, and is, in this embodiment, of a rectangular configuration when developed. An armature yoke 14 has a pair of fixed cores 15a and 15b disposed therein in diametrically opposed relationship. The cores 15a and 15b have respective core pieces 16a and 16b spaced by a gap $g$ from one another and also are provided with respective generating coils 17a and 17b wound therearound. The gap $g$ serves for limiting the magnetic paths of the core pieces 16a and 16b. As the core pieces 16a and 16b are in the homopole (same pole) region, the gap $g$ may be narrow, for example, of 1–2 mm. The core pieces 16a and 16b have their inner surfaces disposed in the same circle and are spaced by a distance corresponding to a clearance $c$ from the pole piece 12. The shaft 10 is supported by covers 18 and 19 which are made from a non-magnetic material such as aluminum for cooperating with the drive shaft 10 to minimize the leakage of the magnetic flux. Since there are generated in the coils 17a and 17b electromotive outputs having therebetween a phase difference of 180°, the coils are connected in the reversed direction of winding regardless of whether they are connected in series or in parallel.

In the position shown in FIGS. 2 and 3, the magnetic flux extends from the N pole of the rotary magnetic pole body 11 and through the pole piece 12, the clearance $c$, passing through the core piece 16, the core 15a and the yoke 14 and reaching a pole end plate 20 and thence to the S pole of the rotary magnetic pole body 11 to form a magnetic circuit.

Now, the drive shaft 10 is imparted a rotational force from outside and the rotary magnetic pole body 11 is rotated together with the drive shaft 10. The magnetic flux flowing from the pole piece 12 recedes from the core piece 16a and simultaneously enters into the core piece 16b. The magnetic flux produces magnetic disengagement with the coil 17a and magnetic engagement from the coil 17b. While the rotary magnetic pole body 11 makes former half rotation starting from a position shown in FIGS. 2 and 3, the generation in one half cycle is effected. Relative to the drive shaft 10, the rotary magnetic pole body 11 makes rotation precisely in 180 degrees, that is, one half rotation from a position shown in FIGS. 2 and 3. Then, the magnetic flux flowing from the N pole of the rotary magnetic pole body 11 passes across the pole piece 12, core piece 16b, and core 15b, through the yoke 14 and reaches the S pole of the rotary magnetic pole body 11. Thus, in the course of the magnetic flux, there is formed a magnetic circuit. As the magnetic pole body 11 further rotates, the magnetic flux from the pole piece 12 recedes from the core piece 16b and produces magnetic disengagement from the coil 17b. At the same time, the magnetic flux enters into the core piece 16a and produces magnetic engagement with the coil 17a. During this latter half rotation of the rotary magnetic pole body 11, there is performed the generation in a next half cycle.

Therefore, in one rotation of the rotary magnetic pole body 11, there is produced AC generation for one cycle by the magnetic engagement and disengagement operations. It will be seen that the time instant that the magnetic circuit is switched over is the time instant that the the magnetic flux recedes (or disengages) from the core piece 16a (or the time instant that the magnetic flux enters into (or engages) the core piece 16b) and the time instant that the magnetic flux enters into (engages) the core piece 16a (or the time instant that the magnetic flux recedes from (or disengages) the core piece 16b). Further, in the above AC generation, the engagement and disengagement operations of the magnetic flux with respect to the core pieces 16a and 16b are simultaneously carried out and the coils 17a and 17b interlinking with the magnetic circuit across the core pieces 16a and 16b are reversely connected. In consequence, the AC generating voltage is taken out with efficiency in double amount as much as obtained by either one of the core piece 16a or 16b.

FIGS. 4 and 5 show an embodiment of the single phase, single element and two pole AC generator. Some of the parts of this embodiment are respectively identical with the corresponding parts of the motor shown in FIGS. 2 and 3 and are designated by the corresponding reference numerals. A description is, thus, omitted with respect to these parts of this embodiment. In the instant embodiment, four core pieces 21a, 21b, 21c and 21d are mounted on cores 22a, 22b, 22c and 22d, respectively, and the cores are fixed to the yoke 14 in the interior thereof, the core pieces being spaced by the gaps g from one another. Each of the cores 22a to 22d is wound with generating coils 23a, 23b, 23c or 23d. Pole pieces 24a and 24b are each of an arc extending over 90° in mechanical angle and are mounted by means of a pole cap 13 onto a rotary magnetic pole body 11 in diametrically opposed relationship. Adjoining coils, namely coils 23a and 23d, coils 23d and 23b, coils 23b and 23c, and coils 23c and 23a are connected to each other in reverse connection. Thus, the generator of the instant embodiment generates two cycles of current for one revolution of the rotary magnetic pole body 11. The generating principle is similar to that in the above described embodiment.

Figure 6:
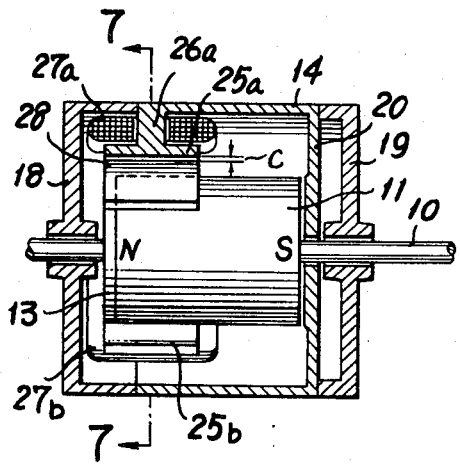
FIG. 6 is a side view of an embodiment of the three phase, single element and single pole AC generator according to the present invention with a part thereof being shown in longitudinal section.

FIGS. 6 and 7 show an embodiment of the three phase, single element and single pole AC generator. Three core pieces 25a, 25b and 25c, each adjacent pair of the pieces being spaced by a gap g, are each provided on a corresponding one of cores 26a, 26b and 26c which in turn are fixed to a yoke 14 in the interior thereof. The cores 26a to 26c are wound with generating coils 27a, 27b and 27c, respectively. A pole piece 28 of an arc form extending over 120° in mechanical angle, is mounted by a pole cap 13 onto a rotary magnetic pole body 11. Each of the generating coils is for each one of the three phases and it is possible to form selectively a star connection or delta connection.

It is to be noted that the motor of the instant embodiment may be modified to have two pole pieces as in the embodiment shown in FIG. 4 and have six yoke pieces so as to form a two-pole type generator.

Figure 9:
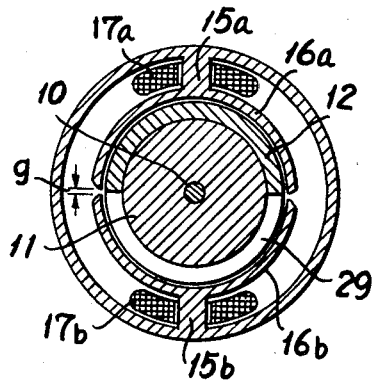
FIG. 9 is a cross-sectional front view taken along line 9—9 in FIG. 8.
Figure 8:
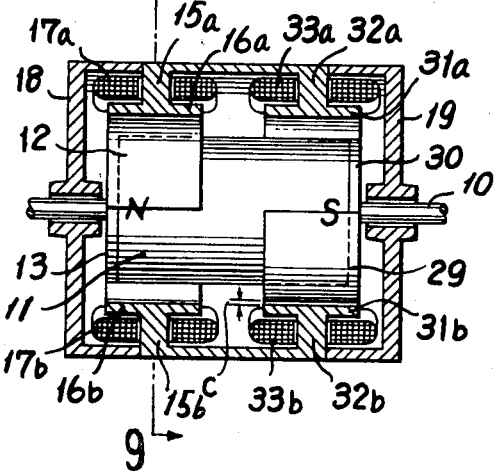
FIG. 8 is a side view of an embodiment of the single phase, two element and single pole AC generator according to the present invention with a part thereof being shown in longitudinal section.

FIGS. 8 and 9 show an embodiment of a single phase, two-element and single pole AC generator. A semi-cylindrical pole piece 12 is mounted by a pole cap 13 onto a rotary magnetic pole body 11 at the N pole portion thereof while a semi-cylindrical pole piece 29 is mounted by a pole cap 30 onto pole piece 12 at the S pole portion in such manner that pole pieces 12 and 29 are in diametrically opposed relationship to one another. Within a yoke 14, are provided cores 15a, 15b, 32a and 32b. Each of the cores 15a and 15b has correspondingly one of core pieces 16a and 16b which are arranged in opposed relation to the pole piece 12. Similarly, each of the cores 32a and 32b has correspondingly one of core pieces 31a and 31b which are disposed in opposed relation to the pole piece 29. The cores 15a, 15b, 32a and 32b are wound with generating coils 17a, 17b, 33a and 33b, respectively. This arrangement makes it possible to utilize both of the N and S poles which results in an increase of space factor. Incidentally, the generator of the instant embodiment may also be modified into a two-phase type by placing the pole pieces 12 and 29 at positions offset from each other by 90°, instead of the pole pieces 12 and 29 being in line or opposed positions.

Figures 10A, 10B, 11:
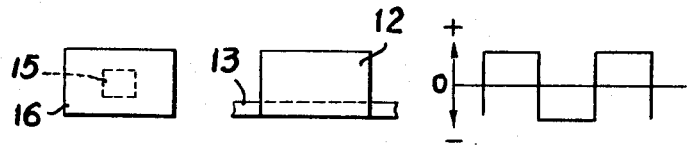
FIG. 10A is a developed plan view of an embodiment of the yoke piece according to the invention.
FIG. 10B is a developed plan view of an embodiment of the pole piece according to the invention.
FIG. 11 diagrammatically illustrates a wave form of the voltage generated where the yoke piece and the pole piece shown in FIGS. 10A and 10B are utilized.

FIG. 10A shows in developed plan view the core piece 16 and the core 15. Similarly, FIG. 10B shows in developed plan view the pole piece 12. The pole piece 12 has rectangular configuration and this causes the generated voltage to have rectangular wave form as shown in FIG. 11.

Figures 12A, 12B, 13:
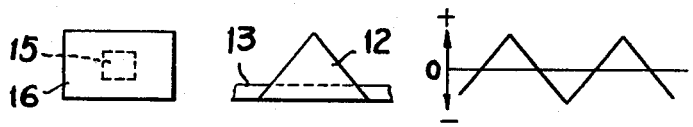
FIG. 12A is a developed plan view of a further embodiment of the yoke piece.
FIG. 12B is a developed plan view of a further embodiment of the pole piece.
FIG. 13 diagrammatically illustrates a wave form of the voltage gnerated where the yoke and pole pieces shown in FIGS. 12A and 12B are utilized.

FIG. 12A shows in developed plan view a modification of the core piece 16 and the core 15. Similarly, FIG. 12B shows in developed plan view a modification of the pole piece 12. The pole piece 12 has a triangular configuration resulting in that the generated voltage has triangular wave form as shown in fig. 13.

Figures 14A, 14B, 15:
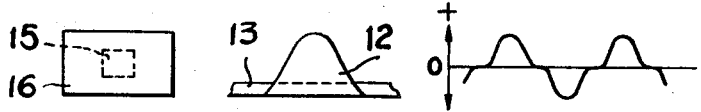
FIG. 14A is a developed plan view of a still further embodiment of the yoke piece.
FIG. 14B is a developed plan view of a still further embodiment of the pole piece.
FIG. 15 diagrammatically illustrates a wave form where the yoke and pole pieces shown in FIGS. 14A and 14B are utilized.

FIG. 14A shows in developed plan view a further modification of the core piece 16 and the core 15. Similarly, FIG. 14B shows a further modification of the pole piece 12 in developed plan view. This pole piece has a configuration coinciding with part of a cycle of a sine wave extending between the two adjacent bottoms of the wave. FIG. 15 illustrates the wave form of the voltage generated by a generator utilizing the pole piece of the above-described form. Therefore, the wave of the voltage has a series of alternately arranged peaks and valleys each coinciding with the pole piece of the above-described configuration. The wave of this form may, therefore, be called "modified sine wave." The voltages generated in two phases are rectified in every phase. A complete DC voltage which is free from ripples can be obtained by adding the rectified voltage in each phase. The configuration of this pole piece is not limited to a sine wave. The configuration may be a wave form that at the point of a half of wave height, the upper half wave form is symmetrical to the lower half one. The wave of this form may be called "upper and lower half symmetrical wave."

It will thus be apparent that, by appropriately selecting the configuration of the pole piece 12, it is possible to obtain a generated voltage of a desired form of wave such as rectangular wave, triangular wave or modified sine wave. And the complete DC voltage which is free from ripples is obtained by rectifying this AC voltage.

Figure 16:
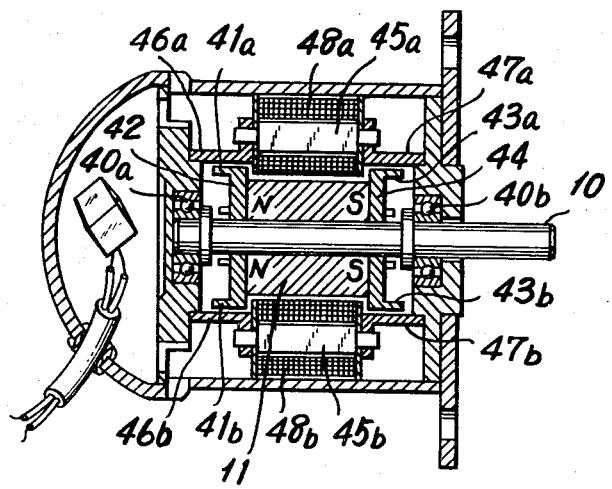
FIGS. 16 and 17 are respectively a vertically sectional side view and a developed plan view of an embodiment of the single phase, two element and two pole AC generator according to the present invention.
Figure 17:
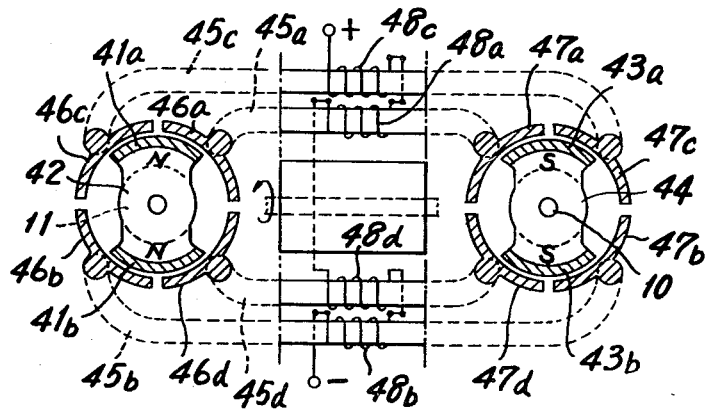

FIGS. 16 and 17 respectively illustrate an embodiment of the single phase, two element and two pole AC generator. This is the type most adapted for practical use and mass production. The rotary drive shaft 10 provided with the rotary magnetic pole body 11 of a ferrite magnet is journaled on bearings 40a and 40b. An end of the rotary magnetic pole body 11 is fixed to a pole cap 42 having pole piece portions 41a and 41b which respectively extend within range of a quarter of a circumference. The other end of the rotary magnetic pole body 11 is also provided with a pole cap 44 having pole piece portions 43a and 43b of the same shape.

Cores 45a–45d have respectively at ends core pieces 46a–46 and 47a–47d opposite to the rotary peripheral surfaces of the pole piece portions 41a, 41b, 43a and 43b. The cores (used also for yokes) 45a–45d are wound with coils 48a–48.

Figure 18:
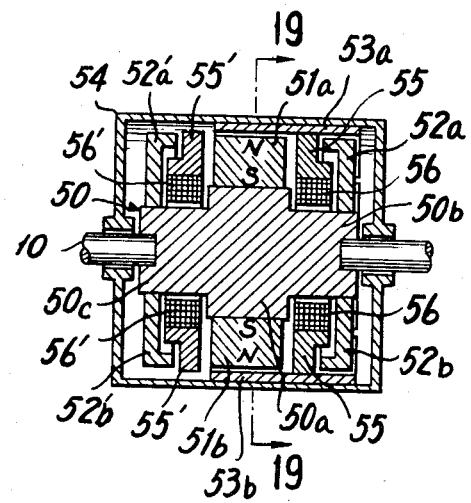
FIGS. 18 and 19 are respectively a vertically sectional side view and a vertically sectional front view taken along the line 19—19 of an embodiment of the single phase, two pole and unified coil type AC generator according to the present invention.
Figure 19:
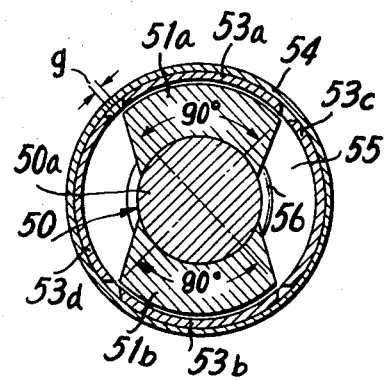
Figure 20:
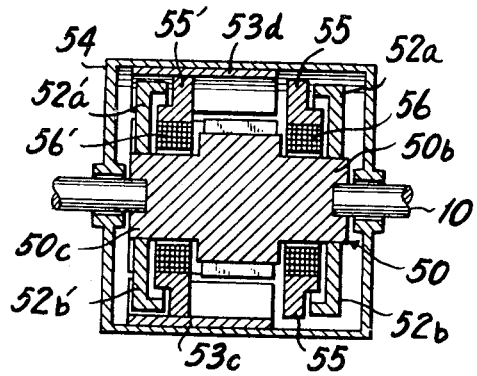
FIG. 20 is a transversely sectional plan view of the AC generator shown in FIGS. 18 and 19.

FIGS. 18 to 20 show respectively an embodiment of the single phase, two pole and unified coil type AC generator. The drive shaft 10 consists of a non-magnetic material and is secured to a rotary core 50 of a magnetic material. The rotary core 50 consists of a large core of a magnetic material. The rotary core 50 consists of a large diameter portion 50a of the cylindrical shape located in the middle, and of small diameter portions 50b and 50c of the cylindrical shape at both right and left ends thereof. At the outer periphery of the large diameter portion 50a of the rotary core 50, there are fixed rotary magnets 51a and 51b spaced apart by an angle of 180°. Each of these rotary magnets has a circumference in the range of 90° in mechanical angle (180° in the electrical angle). The rotary magnet 51a and 51b has the S pole on the inner side namely the side secured to the rotary core 50 and has the N pole on the outer side. Both ends of the uniform core portions 50b and 50c of the rotary core 50 are secured with collecting magnetic poles 52a, 52b, 52a' and 52b' of a magnetic material. The collecting magnetic poles 52a, 52b, 52a' and 52b' have bent portions at edges. The curved arc configuration is identical with the configuration of the magnets 51a and 51b.

Figure 21:
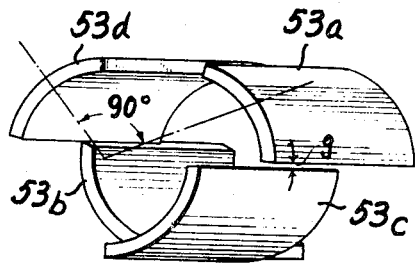
FIG. 21 is a perspective view of a fixed yoke.

Yokes 53a to 53d are respectively secured to the inside of a casing 54 of a non-magnetic material in a circle of 90° in mechanical angle. As shown in FIG. 21, the yokes 53a to 53d are respectively spaced by a gap g from one another. The yokes 53a and 53b are positioned in opposite relationship. And the yokes 53c and 53d are positioned in opposite relationship. Further, the yokes 53a and 53b and the yokes 53c and 53d are alternately disposed in axially displaced relation on the shaft 10. The yokes 53a-53d extend from a position opposite to the end of the rotary magnets 51a and 51b to a position opposite to the outer end of the poles 52a and 52b. The length of an adjacent yoke extends nearly equal to the length of the rotary magnets 51a and 51b.

As shown in FIG. 18, coil frames 55 and 55' are respectively secured to the inner peripheral surfaces of the yokes 53a-53d between the rotary magnets 51a and 51b and the poles 52a and 52b. Coils 56 and 56' of a ring shape are secured to the inner peripheral surfaces of the coil frames 55 and 55' and are prevented from contacting the core portions 50b and 50c of the rotary core 50.

In the position shown in FIGS. 18 and 19, the magnetic flux flowing from the N pole of the rotary magnets 51a and 51b passes respectively through the yokes 53a and 53b, poles 52a and 52b, cores 50b and 50a and reaches the S pole of the rotary magnets 51a and 51b to form two magnetic circuits. It is assumed that the rotary core 50 and rotary magnets 51a and 51b revolve over the mechanical angle of 90° in the clockwise direction from the position shown in FIG. 19. The magnetic flux issued from the N pole of the rotary magnets 51a and 51b then passes respectively through the yokes 53c and 53d, the poles 52a' and 52b', and the core portions 50c and 50a and reach the S pole of the rotary magnets 51a and 51b to form thereby two magnetic circuits.

With the rotation of the rotary magnets 51a and 51b from the position shown in FIG. 19, the magnetic flux from the rotary magnets 51a and 51b respectively recede from the yokes 53a and 53b and simultaneously enter into the yokes 53c and 53d. When the rotary magnets 51a and 51b move over 90° and further rotate, the magnetic flux from the rotary magnets 51a and 51b respectively enter into the yokes 53a and 53d and recedes simultaneously from the yokes 53c and 53d. The AC generation is thus effected in the coil 56' in response to the magnetic engagement with or disengagement from the yokes 53c and 53d.

Generally, when a round iron core which has a large diameter $D$ for passing the magnetism of the same magnitude is split into round iron cores of $x$ number, each of a small diameter $d$, the relationship of each circumference is expressed by $\pi D < x \pi d$. If the total magnetic flux is expressed by $\phi$, the number of windings of a split coil by N and the number of poles by $x/2$, the electromotive force of the AC generator at the speed S is proportional to $\phi x \omega S$. However, if the split round iron core is unified in a round iron core of a diameter D, the function of the magnetic flux becomes $x \phi$, so that the number of windings is sufficient to be N. Thus, the relationship $\pi D < x \pi d$ is established, when $x$ is larger than 2. Therefore, the number of windings that can be severed are $^2 \sqrt{x}$.

The generator of the above described embodiment has the construction which unifies the magnetic circuits of two directions for the magnetic engagement and disengagement, whereby coils can be saved and high efficiency and low cost are obtained.

Figure 22:
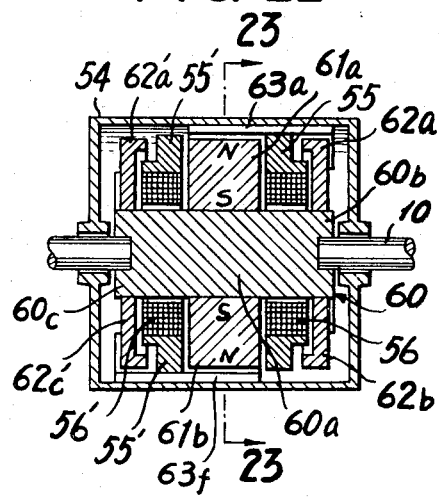
FIGS. 22 and 23 are respectively a vertically sectional side view and a vertically sectional front view taken along the line 23—23 of an embodiment of the single phase, four pole and unified coil type AC generator according to the present invention.
Figure 23:
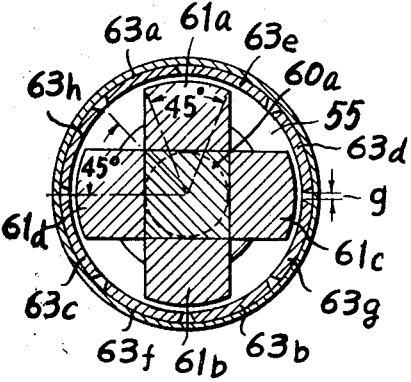

FIGS. 22 and 23 illustrate an embodiment of the single phase, four pole and unified coil type AC generator. Identical parts in the preceding embodiment are shown by identical numerals. A rotary core 60 of magnetic material is secured to the drive shaft 50. The rotary core 60 has a square portion 60a in the middle and cylindrical portions 60b and 60c at both ends thereof. The square portion 60a of the rotary core 60 is secured with four magnets 61a-61d spaced from one another in an angle of 90°, each magnet having a circumference for a mechanical angle of 45° (for electrical angle of 90°). The rotary magnets 61a-61d have respectively the S pole on the inner side and the N pole on the outer side.

Both ends of the cylindrical portions 60b and 60c of the rotary core 60 are respectively fixed with four collecting magnetic poles 62a-62d and 62a'-62d' of the same shape as that of the rotary magnets 61a-61d as seen from the front view. Eight yokes 63a-63h respectively having an arc of 45° are respectively secured to the inner surface of the casing 54. The yokes 63a-63h are alternately disposed in axial offset on the rotary shaft 10 and spaced by a gap g from each other in the similar way as in the preceding embodiment.

Figure 24:
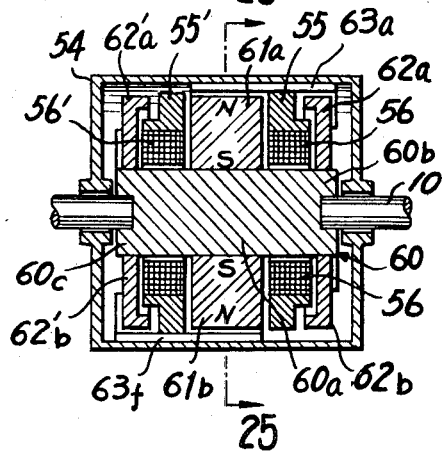
FIGS. 24 and 25 are respectively a vertically sectional side view and a vertically sectional front view taken along the line 25—25 of an embodiment of the two phase, two pole and unified coil type AC generator according to the present invention.
Figure 25:
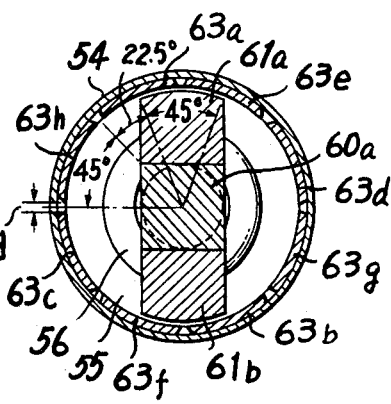

FIGS. 24 and 25 illustrate an embodiment of the two phase, two pole unified coil type AC generator. Identical parts are designated by identical numerals as in the previous embodiments. The square portion 60a of the rotary core 60 is secured with only two rotary magnets 61a and 61b of the identical shape which are spaced for mechanical angle of 180°.

Both ends of the cylindrical portions 60b and 60c of the rotary core 60 are respectively fixed to two poles 62a, 62b and 62a', 62b' of the identical shape as the rotary magnets 61a and 61b as seen from the front view. The construction of yokes 63a-63h is similar to that of the preceding embodiment. The coils 56 and 56' respectively form single phase.

Figure 26:
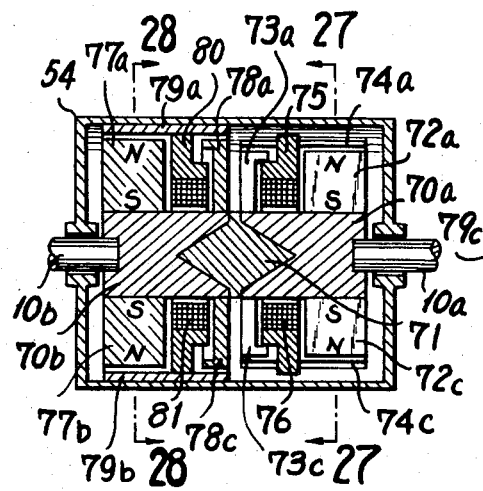
FIGS. 26, 27 and 28 are respectively a vertically sectional view, a vertical cross section taken along the line 27—27 and a vertical cross section taken along the line 28—28 of the single and two phase, two element, four pole and unified coil type AC generator.
Figure 27:
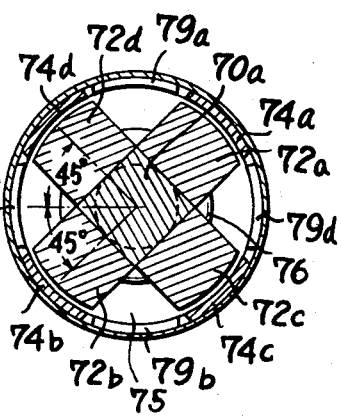
Figure 28:
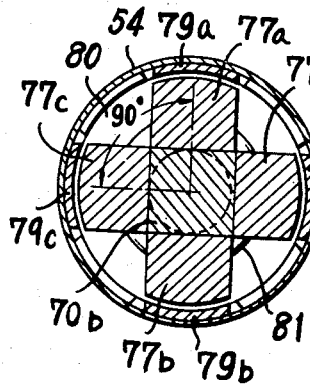

FIGS. 26 to 28 show an embodiment of the single and two phase, two element and four pole unified coil type AC generator. Rotary cores 70a and 70b are secured to the shafts 10a and 10b. The rotary cores 70a and 70b are connected by nonmagnetic body 71 of the shape less in leakage of magnetic flux.

One end of the rotary core 70a is provided to four rotary magnets 70a-72d spaced for angle of 90° each having a circumference of an angle of 45° (electrical angle 90°). The other end of the rotary core 70a is fixed with collecting magnetic poles 73a-73d. On the inner periphery of the casing 54, there are provided yokes 74a-74d spaced from each other for an angle of 45° in the range opposite to the rotary magnets 72a-72d and poles 73a-73d on the inner periphery of the casing 54. A coil frame 75 is attached to the inner periphery of the yokes 74a-74d. A coil 76 is secured to the inner periphery of the coil frame 75.

In the similar manner, one end of the rotary core 70b is fixed to four rotary magnets 77a-77d spaced from each other for an angle of 90° and displaced by 45° with respect to the above rotary magnets 72a-72d, each rotary magnet having an angular circumference of 45° (electrical angle of 90°). The other end of the rotary core 70b is fixed with collecting magnetic poles 78a-78d. Yokes 79a-79d are provided on the inner periphery of the casing 54, each of which has an angular circumference of 45° and spaced apart from each other by an angle of 45° with a displacement of 45° from the yokes 74a-74d. A coil frame 80 is secured to the inner periphery of the yokes 79a-79d and a coil 81 is fixed to the inner periphery of a coil frame body 80. The AC generator of this embodiment of the above construction serves for the single phase system as well as for the two phase system.

Figure 29:
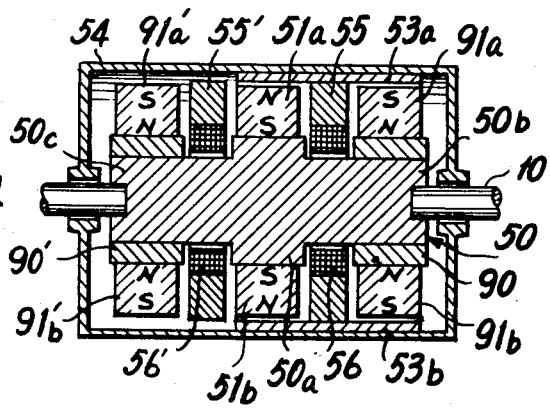
FIG. 29 is a vertically sectional view of modified embodiment of the AC generator shown in FIG. 18.

FIG. 29 illustrates another modification of the AC generator shown in FIG. 18. Identical parts shown in FIG. 18 are designated by identical numerals. Both ends of the rotary cores 50b and 50c are fixed respectively with yoke cores 90 and 90'. On the outer periphery of the yoke cores 90 and 90', there are fixed rotary magnets 91a, 91b, 91a' and 91b'. The rotary magnets 51a and 51b have the S pole on the inner side and the N pole on the outer side, whereas the rotary magnets 91a, 91b, 91a' and 91b' have respectively the N pole on the inner side and the S pole on the outer side. Difference in comparing the constructions shown in FIGS. 18 and 29 consists of that the number of the core used for one element is reduced by half. As distinguished from the preceding embodiment, the magnetic attraction force temporarily functions but it is negligible, because it is cancelled by the balance between two elements.

A description of examples of uses of the generator according to the present invention will be made hereunder.

I. HOMOPOLE TYPE AC GENERATOR FOR DETECTION OF POTENTIAL SPEED

Generally, a generator for detecting rotating velocity, such as a generator for a tachometer, is required to be of such a character as to generate a voltage which is exactly and linearly in proportion to the number of per minute.

Since a permanent magnet, for example, Barium-ferrite permanent magnet, is not of ferromagnetic material, the magnetic material per se has an extremely reduced specific permeability while having a remarkably large magnetic potential as it is apparent from the fact that the magnetization of the material depends on a strong magnetic field. It is recognized that when the dimension of a gap positioned in a magnetic circuit magnetized by such magnet is varied within a limit, the density of the magnetic flux passing across said varied gap hardly varies. Whereas, if the gap is varied beyond said limit, the density of the magnetic flux decreases severely.

It is said that the larger the unit of magnetic energy integration of a permanent magnet is, the more superior the magnet is, said integration being the representative total coercive force and the remanence of the magnet. It is, however, not understood as yet to what kind of component the magnetic energy is which would compensate the increase of the reluctance resulting from the variation of the gap dimension. Accordingly, the energy functioning as such is hereunder termed as "latent magnetizing power" for sake of convenience. The value of the latent magnetizing powers of various kinds of permanent magnets may be known by establishing magnetic circuits with variable gaps being provided therein, respectively, and by measuring the magnetic flux density at the gap for each magnet.

It is the first requirement of the instant example that a permanent magnet of large latent magnetizing power be used to form the rotary magnetic pole body of the homopole type AC generator as described hereinabove in conjunction with the accompanying drawings.

A dimensional increase of a gap $c$ between a magnetic pole and an armature means a relative decrease of the above-mentioned latent magnetizing power. It is, therefore, the second requirement of the instant example that the gap be made as small as possible so as to obtain a relatively large magnetizing latent power in a static magnetic circuit.

When a generator is driven, the magnetism is varied and there is produced a reversed magnetic field due to an eddy current in the armature core as well as a hysteresis loss. These magnetic losses progressively consume the latent magnetizing power in the magnetic pole as the rotational speed and the generated voltage increase. It is, therefore, the third requirement of the instant example to utilize as the magnetic pole a magnet of extremely small reversible permeability so as to prevent production of a reversed magnetic field. Incidentally, the second and the third requirements mentioned above are in complementary relationship to each other and, in this sense, both requirements may be regarded as one requirement.

It is mentioned that the above-mentioned features are attained with a Barium-ferrite magnet or a Manganese-ferrite magnet etc.

It is the fourth requirement of the instant example to select a generator whose core is of reduced hysteresis loss.

Figure 30:
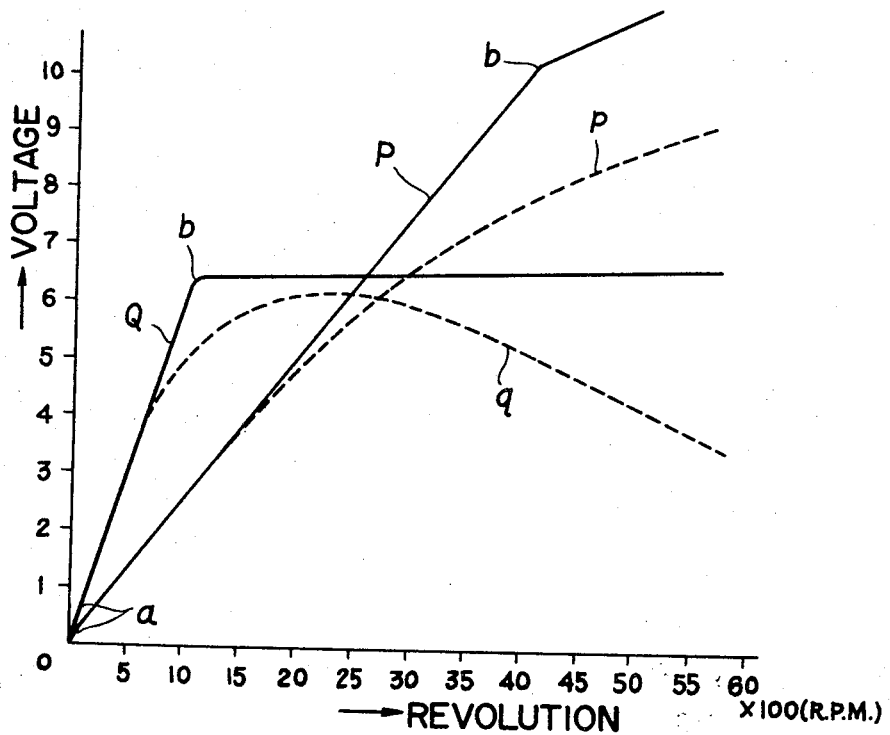
FIG. 30 is a diagram wherein the characteristics of the AC generators of respective embodiments of the present invention and of a conventional AC generator are illustrated with respect to their speeds relative to the voltages generated.

The full line P in FIG. 30 represents, as an example, the characteristic of the homopole type AC tacho-generator of the present invention which has been made to satisfy the first to fourth requirements above mentioned, said characteristic being with respect to the speed of the generator relative to the voltage generated thereby. It will be apparent from the figure that the part of the line P between alternate points $a$ and $b$ thereon is completely linear. The dashed line $p$ in this figure represents the character of a conventional tacho-generator. For example, in the case where the gap $c$ is 0.5mm, the points $a$ and $b$ are positioned at 300 rpm and 1,500 rpm, respectively, whereas, where the clearance $c$ is 0.15 mm, the points $a$ and $b$ are positioned at 30 rpm and 4,950 rpm, respectively. While the above requirements are applicable to conventional multipolar-cross movement type generators, remarkably increased advantages can be obtained when the requirements are applied to the homopole type AC generator of the present invention.

II. POWER SOURCE GENERATOR FOR USE WITH VARIABLE SPEED ENGINE

A power source generator which receives its generative power from an internal combustion engine is driven at variable speed, such as in a vehicle. It is, therefore, required that a generator operated in such way generates a constantly stabilized voltage.

A conventional electrical power source generator utilizes a regulator for regulating the exciting force of an electromagnetic pole. This type of generator has many attachments and suffers essentially from frequent drawbacks due to its complicated mechanism. Generally, the generator of this class generates three phase alternating current for obtaining an increased rectification efficiency. The rectification and the generated AC current is subjected to parallel rectification which is carried out with six commutators. With this system, however, there is produced a ripple voltage of the order of 30 percent and a loss of about 40 percent of the generated voltage resulting in a poor rate of use.

Next, a description is made with respect to the problems accompanied by charging a power source generator. These problems are usually overlooked. Assuming that $E_1$ denotes the generated voltage, $E_2$ battery voltage, $I$ charging current, $R_1$ the internal resistance of the generator and $R_2$ the internal resistance of the battery, the current $I$ of this electrical circuit is represented by the following formula:

$$I = (E_1 - E_2)/(R_1 + R_2)$$

That is to say, $(E_1-E_2)$ is a voltage which is not detected at the terminals. Usually, however, $E_1 = E_2$ is regarded as the terminal voltage and the apparent output $W_2$ of the generator is regarded as being equal to $E_2I$, that is, $W_2 = E_2I$. Assuming that $W_0$ designates the apparent generator power and $W_1$ indicates the apparent internal loss of the generator, $W_0 = W_1 + W_2 = I^2R_1 + I^2R_2$ to give $W_0 = (E_1 - E_2)I$. Thus, the apparent efficiency $e_0$ is represented as follows: $e_0 = E_2I/E_1I$. Therefore, the effective efficiency $e$ equals $R_2/(R_1 + R_2)$. It is, accordingly, liable to be overlooked that substantial parts of usually so-called output power of a generator is an internal loss of the generator as far as a generator for charging is concerned.

A multipolar three phase generator has the winding with turns bridged over different kinds of poles resulting in longer length of winding. Thus, it is extremely difficult for this system to have the arrangement whereby $R_1$ is greater than $R_2$ and, accordingly, it is the existing and actual situation that the value of $e$ is less than 10 percent.

A description is made hereunder with respect to the requirements for the generator of the instant embodiment of this invention. For the rotary magnetic pole body 11 a permanent magnet of predetermined latent magnetizing power and of decreased reversible permeability is utilized. The armature core is formed from a material of such nature that the hysteresis magnetic loss varies in reverse proportion to the variation in rotational speed number of revolution. The generator is of such arrangement that the dimensional value of the gap $c$ between the magnetic pole surface and the armature is so determined that the total amount of the latent magnetizing power being reduced by the gap and the amount of the latent magnetizing power being consumed due to the hysteresis magnetic loss is balanced with the predetermined latent magnetizing power of the magnetic pole, whereby a constant voltage is generated regardless of whether the speed exceeds a fixed value. It is, therefore, possible to control fully automatically the voltage with-out relying on an external regulating means such as an existing set of regulator and attachments thereto. Also, by remarkably lowering the coefficient of induction of the generating coils for minimizing an increase of the impedance, it is possible to reduce generation of a surging voltage as well as to increase the generating efficiency. Incidentally, though the above requirements are applicable to a conventional multipolar-cross movement type generator, it is stressed that greater advantages are obtainable from the homopolar generator of the present invention when the above requirements are applied thereto.

A description is made hereunder with respect to the general principle. Functional effect by the latent magnetizing power has been briefly described hereinabove. Generally, it is recognized that a magnetic circuit may be solved in accordance with Ohm's law. When the fact, that the magnetic flux density does not vary with the variation of the dimensional value of a gap positioned in series within a magnetic circuit, is applied to a case wherein the fact is solved according to Ohm's law, it may be considered that the reluctance of a magnet body corresponds to the ohmic resistance and is designated by $R_o$ and that the reluctance of a gap corresponds to the reactance resistance and is designated by $\omega L$. Considering the impedance relative to the variation of $\omega L$ and represented by $$Z = \sqrt{R_o^2 + \omega^2 L^2},$$

since $R_o$ is of an extremely larger value, little variation arises in the real number of the impedance and, as the value of $R_o$ comes closer to the value of the above $\omega L$, the variation becomes remarkable. In this case, the latent magnetizing power may be considered a similarity of the reluctance.

On the other hand, since the hysteresis magnetic loss increases in proportion to $\omega$(angular velocity), it is understood that the variation of the value of impedance $Z$ will proceed with a course wherein the value abruptly increases to decrease the density of the magnetic flux through the gap.

The hysteresis magnetic loss is in proportion to the area of the hysteresis loop as represented by Steinmetz's experimental formula. This formula, however, expresses a loss in electrical power and it should of course be understood that, in the case where the magneto-motive power is produced by a permanent magnet, the formula is related to a mere resisting power ($H_p$) which would act against the passage of magnetizm. Therefore, after a state represented by $R_o = L + H_p$ is established, the impedance $Z$ is in proportion to the increase in the resisting power $H_p$. By appropriately selecting the value of the resisting power $H_p$, therefore, it is possible to generate a voltage of a fixed and stabilized value which is held in balance with the variation of the angular velocity. As an example, silicon steel plate core of about $30 \times H_p$ is utilized in a generator for the use for an automobile engine. In addition, counter magnetic fields are usually produced by the currents flowing through the generating coils. Since, however, a magnetic material is of an extremely reduced reversible permeability, the produced counter magnetic field is of very small value in the instant example.

The characteristic diagram, regarding the rotational speed relative to the voltage generated, of the generator according to the last described example is illustrated, as an example, in FIG. 15 by the full line Q. As will be apparent from the illustration, the generated voltage is in proportion to the revolutions per minute as far as the number thereof is on the line portion between the points $a$ and $b$ whereas, after the number of the revolution r.p.m. reaches the point $b$, the voltage is kept substantially constant regardless of the increase of the r.p.m. Thus, the generator is suitable for use with an internal combustion engine or the like whose number of revolutions per minute vary widely. Incidentally, the dashed line $q$ in FIG. 30, represents the character of a conventional generator.

With the homopole type AC generator, one can obtain a single phase current of rectangular voltage wave, and this current may be subjected to full-wave rectification to be converted into complete direct current. The distance between the generating coils in the homopole type AC generator may be reduced to the extent from one third to one fifth the distance in three phase type generator. Furthermore, a wire of a larger diameter is utilizable for the winding of the homopole type AC generator, resulting in a decrease in electrical resistance to the extent from one tenth to one twentieth of the resistance in a three-phase type generator and also resulting in a remarkable increase in generating efficiency. It is further pointed out that the generator is of single phase type which necessitates only four commutator elements and simplified winding to thereby serve to lower the cost.

What I claim is:

1. A homopole type AC generator comprising a rotary shaft rotatably driven by a rotational force from the outside, a rotary magnetic pole body integrally rotatable with said rotary shaft and having magnetic poles, yoke cores fixedly disposed externally of said rotary magnetic pole body through which a magnetic flux passes from the N pole of said rotary magnetic pole body and reaches the S pole to form a magnetic path, and a plurality of generating coils fixedly provided at positions interlinking said magnetic path, said yoke core having an inner peripheral surface opposite to the circumference of rotation of said rotary magnetic pole body and a plurality of cylindrical core piece portions split with small space from one another in the peripheral direction, said rotary magnetic pole body having at least one pole piece portion opposite with a small gap to the inner peripheral surface of said core piece portions and having a peripheral surface of a circular angle equal to that of one core piece portion, wherein said generating coils have induced AC voltage when the magnetic flux which passes through the core piece portion of said yoke core from said pole piece portion of said rotary magnetic pole body rotating with said rotary shaft by rotational force from the outside makes magnetic engagement with and disengagement from said generating coil.

2. The homopole type AC generator as claimed in claim 1, wherein said rotary magnetic pole body consists of a cylindrical permanent magnet having the N and S poles at both ends thereof such that the magnetic axis is located in the same line as the axis of said rotary shaft, said generating coils being equal in the number as said core piece portions and disposed in positions corresponding to said core piece portions and interlinking the magnetic path passing through said yoke core, and said pole piece portions being of a magnetic material of a split and cylindrical shape and having at least one of said peripheral surfaces secured to at least one of the magnetic poles on the peripheral surface of said cylindrical permanent magnet.

3. The homopole type AC generator as claimed in claim 1, wherein said rotary magnetic pole body is of a cylindrical permanent magnet having the N and S poles at both ends such that the magnetic axis may be located in the same line as the axis of said rotary shaft, said pole piece portions being pole caps which are secured to both ends of said cylindrical permanent magnet and having said peripheral surface, said generating coils being wound on the yoke cores and respectively connecting said core piece portions arranged opposite to said pole caps.

4. The homopole type AC generator as claimed in claim 1, wherein said rotary magnetic pole body comprises a rotary magnetic material body secured to said rotary shaft and at least one rotary permanent magnet having the N and S poles on the outer and inner sides thereof such that the magnetic axis is vertically positioned with respect to the direction of axis of said rotary shaft and said outer end has said outer peripheral surface, said yoke cores having an inner peripheral surface opposite to the rotary peripheral surface of said rotary magnet and being respectively located with small gaps from one another in the peripheral direction and being alternately disposed in displacement from one another axially of said rotary shaft, and said generating coils being disposed in parallel with the rotary surface of said rotary magnet and surrounding said rotary magnetic pole body.

5. The homopole type AC generator as claimed in claim 1, wherein said permanent magnet has a large latent magnetic power and a small reverse permeability, and the gap between said core piece portion and said pole piece portion is substantially small whereby the linear range speed electromotive voltage characteristic is increased.

6. The homopole type AC generator as claimed in claim 1, wherein said permanent magnet is of a construction which has a latent magnetic power of a predetermined value and a small reverse permeability, said yoke core being of an iron core having adequate hysteresis loss, and the gap between said core piece portion and said pole piece portion being selected of an appropriate value, whereby the electromotive voltage of substantial value is obtained for the rotation frequency larger than predetermined.

* * * * *